(12) United States Patent
Wang et al.

(10) Patent No.: US 11,360,763 B2
(45) Date of Patent: Jun. 14, 2022

(54) LEARNING-BASED AUTOMATION MACHINE LEARNING CODE ANNOTATION IN COMPUTATIONAL NOTEBOOKS

(71) Applicant: International Business Machines Corporation, Armonk, NY (US)

(72) Inventors: Dakuo Wang, Cambridge, MA (US); Lingfei Wu, Elmsford, NY (US); Yi Wang, Ann Arbor, MI (US); Xuye Liu, Troy, NY (US); Chuang Gan, Cambridge, MA (US); Si Er Han, Xi'an (CN); Bei Chen, Blanchardstown (IE); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 17/069,402

(22) Filed: Oct. 13, 2020

(65) Prior Publication Data
US 2022/0113964 A1 Apr. 14, 2022

(51) Int. Cl.
G06F 8/73 (2018.01)
G06F 40/169 (2020.01)
G06N 20/00 (2019.01)

(52) U.S. Cl.
CPC .............. *G06F 8/73* (2013.01); *G06F 40/169* (2020.01); *G06N 20/00* (2019.01)

(58) Field of Classification Search
USPC ........................................................ 717/123
See application file for complete search history.

(56) References Cited

U.S. PATENT DOCUMENTS

| 2016/0011905 A1* | 1/2016 | Mishra | G06F 8/34 718/102 |
| 2019/0066133 A1* | 2/2019 | Cotton | G06N 5/04 |
| 2020/0250562 A1* | 8/2020 | Bly | G06N 5/022 |
| 2020/0311607 A1* | 10/2020 | Mestres | G06F 21/6245 |

(Continued)

OTHER PUBLICATIONS

"What Is Model Training?" Oden Technologies website [full url in ref.]; Jul. 30, 2020 (Year: 2020).*

(Continued)

*Primary Examiner* — Qing Chen
*Assistant Examiner* — Clint Thatcher
(74) *Attorney, Agent, or Firm* — Sherman IP LLP; Kenneth L. Sherman; Hemavathy Perumal

(57) ABSTRACT

One embodiment of the invention provides a method for automated code annotation in machine learning (ML) and data science. The method comprises receiving, as input, a section of executable code. The method further comprises classifying, via a ML model, the section of executable code with a stage classification label indicative of a stage within a workflow for automated ML that the executable code applies to. The method further comprises categorizing, based on the stage classification label, the section of executable code with a category of annotation that is most appropriate for the section of executable code. The method further comprises generating a suggested annotation for the section of executable code based on the category of annotation. The method further comprises providing, as output, the suggested annotation to a display of an electronic device for user review. The suggested annotation is user interactable via the electronic device.

20 Claims, 9 Drawing Sheets

(56) References Cited

U.S. PATENT DOCUMENTS

| | | | |
|---|---|---|---|
| 2021/0319357 A1* | 10/2021 | He | G06N 20/00 |
| 2022/0004914 A1* | 1/2022 | Kirchner | G06F 8/65 |
| 2022/0058334 A1* | 2/2022 | Joshi | G06F 11/3692 |
| 2022/0076143 A1* | 3/2022 | Saha | G06N 5/04 |

OTHER PUBLICATIONS

Terence Shin; "All Machine Learning Models Explained in 6 Minutes"; towardsdatascience.com website [full url in ref.]; Jan. 5, 2020 (Year: 2020).*

Chatterjee, P. et al., "Extracting Code Segments and Their Descriptions from Research Articles," 2017 IEEE/ACM 14th International Conference on Mining Software Repositories (MSR), May 20, 2017, pp. 91-101, IEEE, United States.

Redyuk, S., "Automated Documentation of End-to-End Experiments in Data Science," 2019 IEEE 35th International Conference on Data Engineering (ICDE), Apr. 8, 2019, pp. 2076-2080, IEEE, United States.

Eberhart, Z., et al., "Automatically Extracting Subroutine Summary Descriptions from Unstructured Comments," 2020 IEEE 27th International Conference on Software Analysis, Evolution and Reengineering (SANER), Feb. 18, 2020, pp. 35-46, IEEE, United States.

Mell et al., "The NIST Definition of Cloud Computing," National Institute of Standards and Technology Special Publication 800-145, Sep. 2011, 7 pages.

Wang, D., et al., "Human-AI Collaboration in Data Science: Exploring Data Scientists' Perceptions of Automated AI," Proceedings of the ACM on Human-Computer Interaction, Nov. 2019, pp. 1-24, vol. 3, No. CSCW, United States.

Drozdal, J. et al., "Trust in AutoML: Exploring Information Needs for Establishing Trust in Automated Machine Learning Systems", IUI, Mar. 17, 2020, Association of Computing Machinery, Italy.

Wang, D., et al., "AutoAI: Automating the End-to-End AI Lifecycle with Humans-in-the-Loop," In Proceedings of the 25th International Conference on Intelligent User Interfaces Companion, Mar. 2020, pp. 77-78, ACM, United States, {Abstract only}.

Iyer, S., et al., "Summarizing source code using a neural attention model," In Proceedings of the 54th Annual Meeting of the Association for Computational Linguistics, Aug. 7, 2016, pp. 2073-2083, vol. 1: Long Papers, Berlin, DE.

Rule, A., et al., "Exploration and explanation in computational notebooks," In Proceedings of the 2018 CHI Conference on Human Factors in Computing Systems, Apr. 2018, pp. 1-12, Canada.

Wang, A. Y., et al., "Callisto: Capturing the "Why" by Connecting Conversations with Computational Narratives," In Proceedings of the 2020 CHI Conference on Human Factors in Computing Systems, Apr. 2020, pp. 1-13, ACM, Hawaii, United States.

\* cited by examiner

200

Process
- Load data — 210
- 215

Result — 225

LEARNING-BASED AUTOMATION MACHINE LEARNING CODE ANNOTATION IN COMPUTATIONAL NOTEBOOKS

BACKGROUND

The field of embodiments of the invention generally relate to artificial intelligence (AI), automated machine learning (ML), data science, and human-computer interaction.

Automated ML is the process of automating the process of applying ML to real-world problems. Automated ML involves use of programs and algorithms to automate end-to-end human intensive and highly skilled tasks involved in building and deploying AI models.

In the field of data science, predictive models resulting from automated ML are used to mimic the expertise and workflow of data scientists. The expertise of a data scientist is most valuable from at least three aspects. First, a data scientist has knowledge about a particular domain for a data science problem and its corresponding dataset. Second, a data scientist has insights on different ML models to consider based on prior knowledge of previously selected models. Third, a data scientist has insights on how to present decisions and results of ML models to a non-technical audience, such as strategy analysts and business managers. The combination of these three aspects results in high accuracy and explainability in a timely manner.

Conventional automated ML systems mimic only the technical expertise of data scientists, and do not provide any insights on how to present decisions and results of ML models to a non-technical audience. There is need for an automated ML system that mimics the expertise of data scientists, including their insights on different ML models to consider, and their insights on how to present decisions and results of ML models to a non-technical audience.

SUMMARY

Embodiments of the invention generally relate to automated machine learning (ML), and more specifically, to a method and system for learning-based automated ML code annotation.

One embodiment of the invention provides a method for automated code annotation in ML and data science. The method comprises receiving, as input, a section of executable code. The method further comprises classifying, via a ML model, the section of executable code with a stage classification label indicative of a stage within a workflow for automated ML that the executable code applies to. The method further comprises categorizing, based on the stage classification label, the section of executable code with a category of annotation that is most appropriate for the section of executable code. The method further comprises generating a suggested annotation for the section of executable code based on the category of annotation. The method further comprises providing, as output, the suggested annotation to a display of an electronic device for user review. The suggested annotation is user interactable via the electronic device. Other embodiments include a system for automated code annotation in ML and data science, and a computer program product for automated code annotation in ML and data science. These features contribute to the advantage of providing learning-based automated ML code annotation that mimics the expertise of data scientists, including their insights on different ML models to consider, and their insights on how to present decisions and results of ML models to a non-technical audience. These features also contribute to the advantage of providing an automated ML solution that automatically generate annotations indicative of how data is processed, choices made during the process, and rationales for the choices made.

One or more of the following features may be included. In some embodiments, user interaction with the suggested annotation is tracked. In some embodiments, in response to the user interaction comprising a user selection of the suggested annotation as an approved annotation for the section of executable code, the suggested annotation is added to a computational notebook that includes the section of executable code, such that the suggested annotation is positioned within proximity of the section of executable code. In some embodiments, in response to the user interaction comprising a user rejection of the suggested annotation as an approved annotation for the section of executable code, the suggested annotation is removed from the display. In some embodiments, in response to the user interaction comprising a user edit of the suggested annotation, the suggested annotation is updated in accordance with the user edit. In some embodiment, the user interaction is stored in a database, and the ML model is updated based on one or more user interactions stored in the database. These optional features contribute to the advantage of customizing or personalizing subsequent generation of suggested annotations to preferences of a user.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 6 illustrates examples of different categories of annotations for annotations in a computational notebook, in accordance with an embodiment of the invention;

Figure 1:
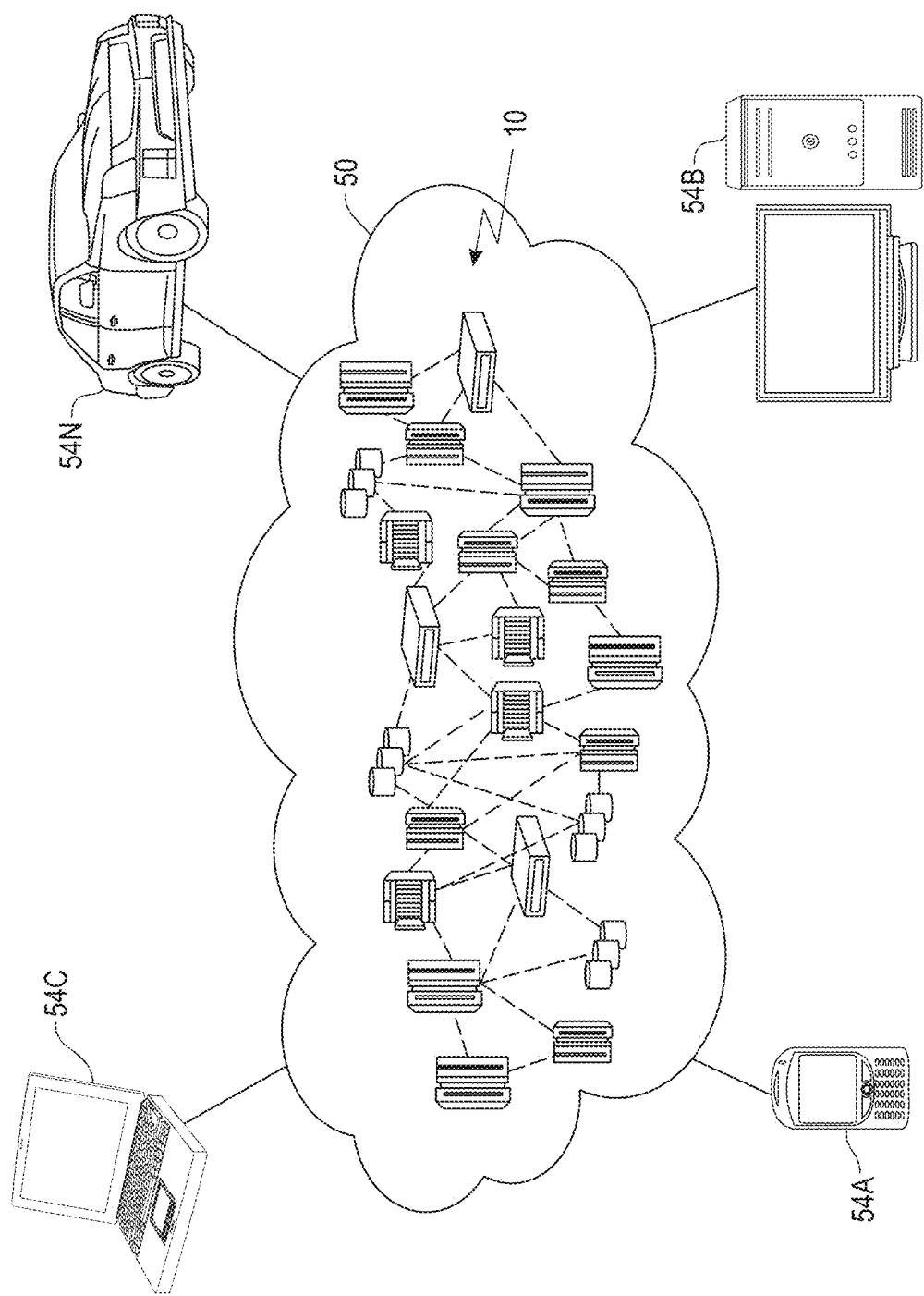
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to automated machine learning (ML), and more specifically, to a method and system for learning-based automated ML code annotation. One embodiment of the invention provides a method for automated code annotation in ML and data science. The method comprises receiving, as input, a section of executable code. The method further comprises classifying, via a ML model, the section of executable code with a stage classification label indicative of a stage within a workflow for automated ML that the executable code applies to. The method further comprises categorizing, based on the stage classification label, the section of executable code with a category of annotation that is most appropriate for the section of executable code. The method further comprises generating a suggested annotation for the section of executable code based on the category of annotation. The method further comprises providing, as output, the suggested annotation to a display of an electronic device for user review. The suggested annotation is user interactable via the electronic device.

Another embodiment of the invention provides a system for automated code annotation in ML and data science. The system comprises at least one processor and a non-transitory processor-readable memory device storing instructions that when executed by the at least one processor causes the at least one processor to perform operations. The operations include receiving, as input, a section of executable code. The operations further comprise classifying, via a ML model, the section of executable code with a stage classification label indicative of a stage within a workflow for automated ML that the executable code applies to. The operations further comprise categorizing, based on the stage classification label, the section of executable code with a category of annotation that is most appropriate for the section of executable code. The operations further comprise generating a suggested annotation for the section of executable code based on the category of annotation. The operations further comprise providing, as output, the suggested annotation to a display of an electronic device for user review. The suggested annotation is user interactable via the electronic device.

One embodiment of the invention provides a computer program product for automated code annotation in ML and data science. The computer program product comprises a computer readable storage medium having program instructions embodied therewith. The program instructions are executable by a processor to cause the processor to receive, as input, a section of executable code. The program instructions are further executable by the processor to cause the processor to classify, via a ML model, the section of executable code with a stage classification label indicative of a stage within a workflow for automated ML that the executable code applies to. The program instructions are further executable by the processor to cause the processor to categorize, based on the stage classification label, the section of executable code with a category of annotation that is most appropriate for the section of executable code. The program instructions are further executable by the processor to cause the processor to generate a suggested annotation for the section of executable code based on the category of annotation. The program instructions are further executable by the processor to cause the processor to provide, as output, the suggested annotation to a display of an electronic device for user review. The suggested annotation is user interactable via the electronic device.

Embodiments of the invention provide a learning-based automated ML code annotation system that mimics the expertise of data scientists, including their insights on different ML models to consider, and their insights on how to present decisions and results of ML models to a non-technical audience. In one embodiment, the system is configured to automatically generate annotations indicative of how data is processed, choices made during the process, and rationales for the choices made.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
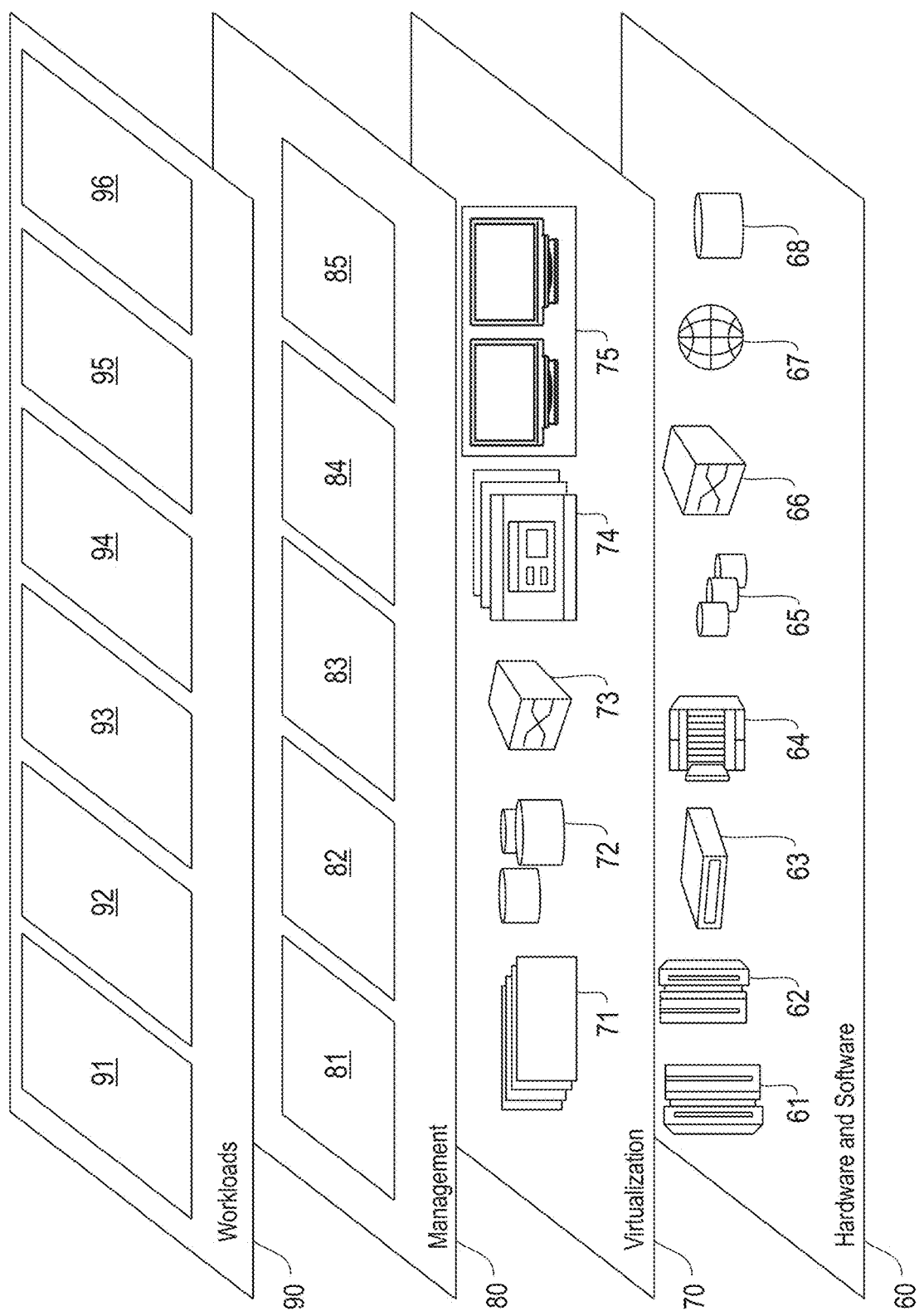
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and automated ML 96 (e.g., a learning-based automated ML code annotation system 330 (FIG. 4), as described in detail later herein).

A computational notebook (also known as a notebook interface) is a virtual notebook environment used for literate programming. In data science, users utilize computational notebooks to analyze data for data science problems. Computational notebooks are authored or drafted by data scientists for use in different applications such as, but not limited to, health care, banking, etc.

A computational notebook comprises one or more sections of narrative text, and one or more additional sections of code or visualization. A section of narrative text comprises one or more annotations. An annotation either generally describes a computational notebook or describes a section of executable code or visualization that immediately follows or precedes the annotation.

Figure 3:
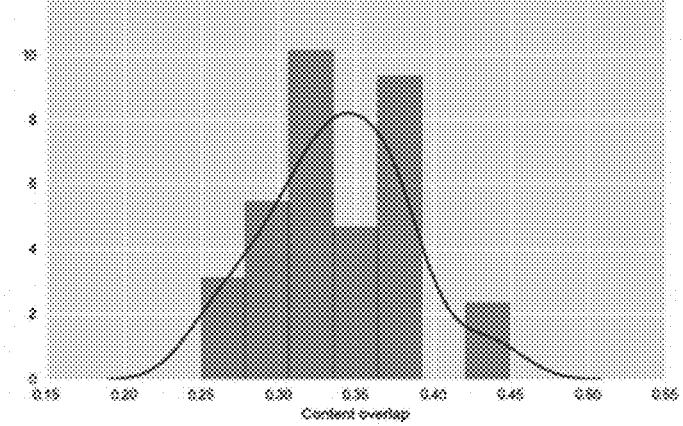
FIG. 3 illustrates an example computational notebook.

FIG. 3 illustrates an example computational notebook 100. As shown in FIG. 3, the computational notebook 100 comprises at least one of the following sections: (1) a section 110 of narrative text including a title for the notebook 100 and an introduction describing a ML model, (2) a section 120 of code including one or more statements importing one or more external packages, (3) a section 130 of narrative text including a description of one or more parameters for the model ("model parameters"), (4) a section 140 of code including one or more statements implementing the model parameters, (5) a section 150 of narrative text including a description of need to profile data, (6) a section 160 of code including one or more statements plotting the profile data, and (7) a section 170 of visualization including an inline plot of the profile data.

Often times, annotations are missing from a computational notebook. For example, a computational notebook may not include annotations such as, but not limited to, a title for the notebook, an introduction for the notebook, a description of model parameters, and a description of need to profile data.

Figure 4:
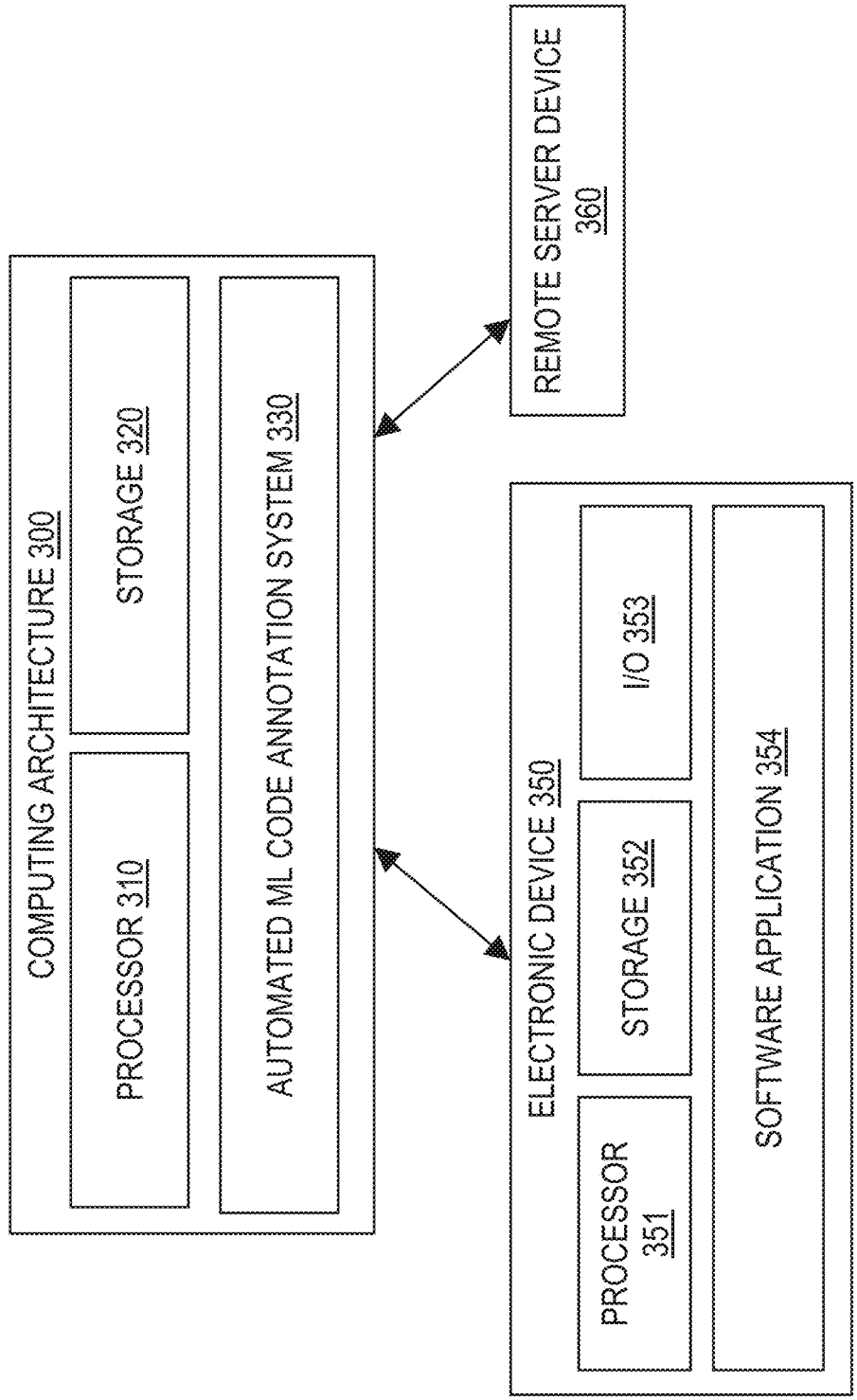
FIG. 4 illustrates an example computing architecture for implementing learning-based automated ML code annotation for computational notebooks, in accordance with an embodiment of the invention.

FIG. 4 illustrates an example computing architecture 300 for implementing learning-based automated ML code annotation for computational notebooks, in accordance with an embodiment of the invention. In one embodiment, the computing architecture 300 is a centralized computing architecture. In another embodiment, the computing architecture 300 is a distributed computing architecture.

For expository purposes, the terms "suggested annotation" and "candidate annotation" are used interchangeably in this specification.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a learning-based automated ML code annotation system 330. The system 330 is an automated ML system configured to automatically predict or generate one or more annotations for a computational notebook. As described in detail later herein, the system 330 is configured to: (1) receive a computational notebook comprising one or more sections of code or visualization, (2) for each section of executable code or visualization without an existing annotation, classify the section and predict or generate a suggested annotation (i.e., a recommended or predicted annotation) for the section based on the classification, and (3) provide/present each suggested annotation to a display for user review, wherein the user review includes selecting, approving/validating, editing, or rejecting the suggested annotation.

In one embodiment, the system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., validation properties, thresholds, etc.), provide input (e.g., validate and/or edit a suggested annotation), etc.

In one embodiment, an electronic device 350 and/or a remote server device 360 may be a source of at least one of the following: a domain ontology, one or more corpus documents, or a trained model.

In one embodiment, the system 330 may be accessed or utilized by one or more online services (e.g., AI services) hosted on a remote server device 360 and/or one or more software applications 354 (e.g., AI applications) operating on an electronic device 350. For example, in one embodiment, a virtual assistant, a search engine, or another type of software application 354 operating on an electronic device 350 can invoke the system 330 to perform an AI task.

Figure 5:
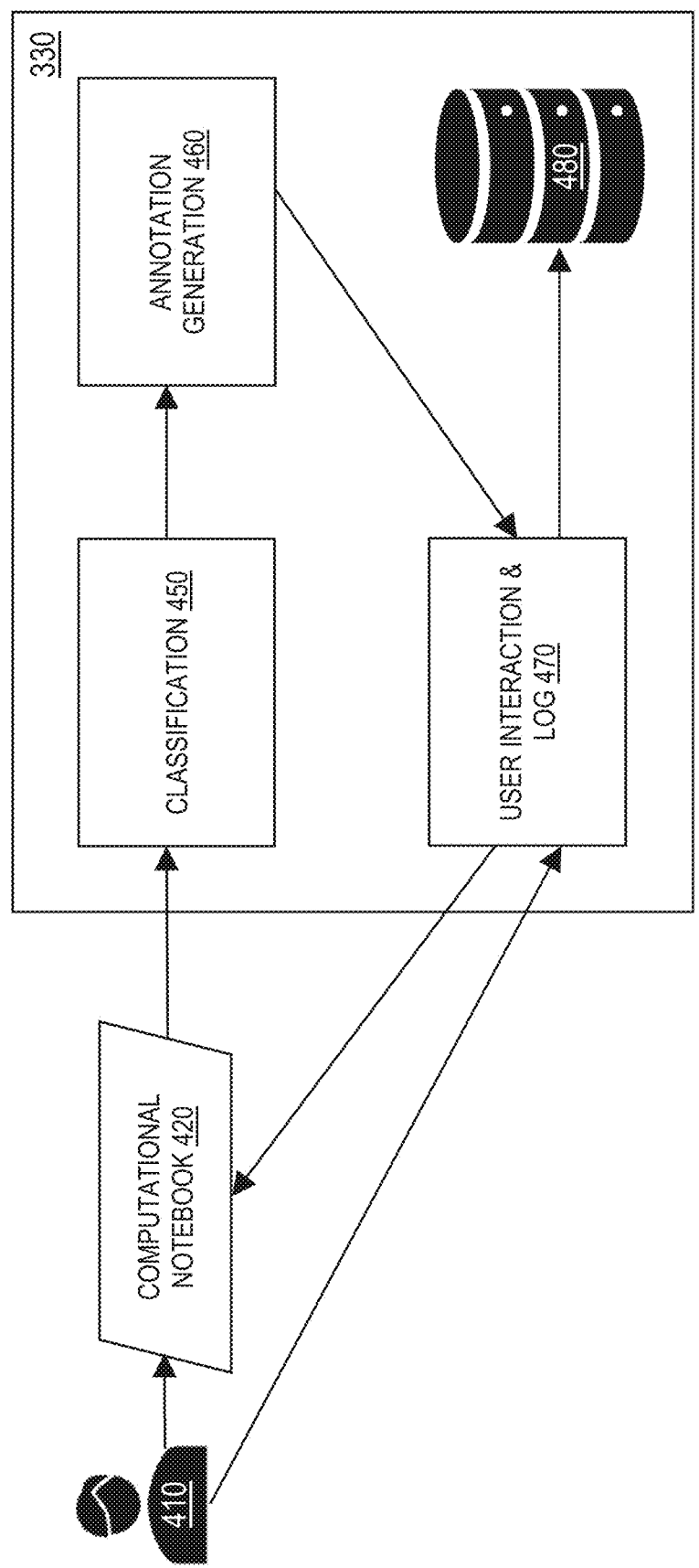
FIG. 5 illustrates an example learning-based automated ML code annotation system, in accordance with an embodiment of the invention.

FIG. 5 illustrates an example learning-based automated ML code annotation system 330, in accordance with an embodiment of the invention. In one embodiment, the system 330 comprises a classification system 450 configured to: (1) receive a computational notebook 420 (e.g., from an electronic device 350 or a remote server device 360), (2) identify, in the computational notebook 420, one or more sections of executable code/visualization without an existing annotation, and (3) for each section of executable code/visualization without an existing annotation, classify the section of executable code/visualization with one or more classification labels. A computational notebook 420 is authored or drafted by a user 410 (e.g., a data scientist).

In one embodiment, the classification system 450 is configured to classify a section of executable code/visualization without an existing annotation along two dimensions. Specifically, the classification system 450 is configured to classify a section of executable code/visualization without an existing annotation with two different classification labels: (1) a stage classification label representing a stage within a pipeline/process/workflow for automated ML that the section of executable code/visualization applies to, and (2) a category classification label representing a category (i.e., type) of annotation most appropriate/suitable for the section of executable code/visualization, wherein the category classification label is based on the stage classification label.

Table 1 below provides examples of different stage classification labels the classification system 450 is trained to classify a section of executable code/visualization with, in one embodiment of the invention. The different stage classification labels represent different stages within the pipeline/process/workflow for automated ML.

TABLE 1

| Stage Classification Label | Description of Stage Represented |
|---|---|
| Data Loading | Acquire data that will be used to build a model |
| Data Profiling and Exploratory Data Analysis | Automatically assess overall data quality, detect noise in labels, skewness and correlations, class imbalance, and target distributions |
| Data Cleaning and Quality Remediation | Automatically clean or filter data with explanations |
| Data Bias Detection and Mitigation | Find bias, homogeneity in target labels and propose de-bias techniques |
| Variable Encoding | One hot encoding, ordinal encoding, determine best encoding strategy for certain features |
| Feature Transformation | Principal Component Decomposition (PCD), Arithmetic, Trigonometric functions, determine a ranked list of features that should be added or dropped |
| Feature Aggregation | Aggregation of features, e.g., based on time or location |
| Feature Selection | Remove unnecessary and repetitive features to create an optimal feature set |
| Feature Augmentation with Domain Knowledge | Automatically identify column concepts and link them to derive useful new features based on domain knowledge (e.g., Wikipedia) |
| Sub-Sampling and Train-Test Splitting | Automatically determine the best strategy for train-test splitting and sub-sampling methodology for large data |
| Model Selection | Choose right model to fit to the data |
| Model parameter tuning | Choose model parameters that make the model perform well |
| Model Validation | Ensure generalizability of a model |
| Applying Model | Apply model to the given test dataset |

Table 2 below provides examples of different category classification labels the classification system 450 is trained to classify a section of executable code/visualization with, in one embodiment of the invention.

TABLE 2

| Category Classification Label | Description of Category Represented |
|---|---|
| Process | Explanation of what the section of executable code is doing |
| Alternative | Explanation of an alternative solution (which is not implemented) |
| Result | Explanation of the result |
| Education | Explanation of how a method works in general |
| Reference | External references |
| Pipeline | Explanation of a pipeline/process/workflow for automated ML |
| Reason | Explanation of why |
| Problem Overview | Explanation of the data science problem or objective of the data science project |
| Data Overview | Explanation of where the dataset comes from, what features are included in the dataset, and potential bias in the dataset |
| Author Information | Background of user who authored or drafted the computational notebook |
| Audience | Dimension |
| Others | Other information not covered above |

In one embodiment, the system 330 comprises an annotation generation system 460 configured to: (1) for each section of executable code/visualization without an existing annotation, receive one or more classification labels the section of executable code/visualization is classified with (e.g., from the classification system 450), and (2) for each section of executable code/visualization without an existing annotation, generate one or more suggested annotations for the section of executable code/visualization based on one or more classification labels the section of executable code/visualization is classified with. The annotation generation system 460 automatically generates variations of annotations for a section of executable code/visualization in an appropriate context of workflow, based on classification labels the section of executable code is classified with. These automatically generated annotations are indicative of how data is processed, choices made during the process, and rationales for the choices made.

In one embodiment, each of the classification system 450 and the annotation generation system 460 utilizes a ML model (e.g., a neural network) trained based on training data comprising a collection of computational notebooks for different applications and a collection of pre-determined classification labels corresponding to different sections of executable code/visualization of the computational notebooks. The training can include learning specific types of code, in specific stages of the pipeline/process/workflow for automated ML, and generating specific types of annotation as needed.

In one embodiment, the system 330 comprises a user interaction and log system 470. For each section of executable code/visualization without an existing annotation, the user interaction and log system 470 is configured to: (1) receive one or more suggested annotations generated for the section of executable code/visualization (e.g., from the annotation generation system 460), (2) generate a list of candidate annotations for the section of executable code/visualization, wherein the list of candidate annotations includes each suggested annotation generated for the section of executable code/visualization, (3) provide/present the list of candidate annotations within a computational notebook environment for user review, (4) track user interaction with the list of candidate annotations, and (5) in response to user selection of a candidate annotation from the list of candidate annotations as an approved/validated annotation for the section of executable code/visualization, add the selected candidate annotation to the computational notebook 420 that includes the section of executable code/visualization, wherein the selected candidate annotation is positioned within proximity of the section of executable code/visualization (e.g., above or below the section of executable code or visualization). The user interaction and log system 470 is configured to modify/update the computational notebook 420 to a version that includes the selected candidate annotation. In one embodiment, the user interaction and log system 470 is configured to export the modified/updated version of the computational notebook 420 (i.e., the version with the selected candidate annotation added).

In one embodiment, a user 410 who authored or drafted a computational notebook 420 can review and interact with a list of candidate annotations via one or more I/O unit 353 integrated in or coupled to an electronic device 350. The user 410 can select a candidate annotation from the list of candidate annotations and edit the selected candidate annotation, approve/validate the selected candidate annotation, or reject the selected candidate annotation.

In one embodiment, the system 330 comprises a log database 480. The user interaction and log system 470 stores each user selection (and edits, if any) of a candidate annotation in the log database 480 to track preferences of a user 410. Such optional user feedback the system 330 receives from users on candidate annotations can be used to improve the generation of subsequent annotations. For example, in one embodiment, the annotation generation system 460 updates/tunes/trains its ML model based in part on one or more user selections stored in the log database 480, thereby customizing or personalizing subsequent generation of suggested annotations to preferences of a user 410.

In the pipeline/process/workflow for automated ML, the system 330 may be utilized for model validation and presentation.

Figure 6:
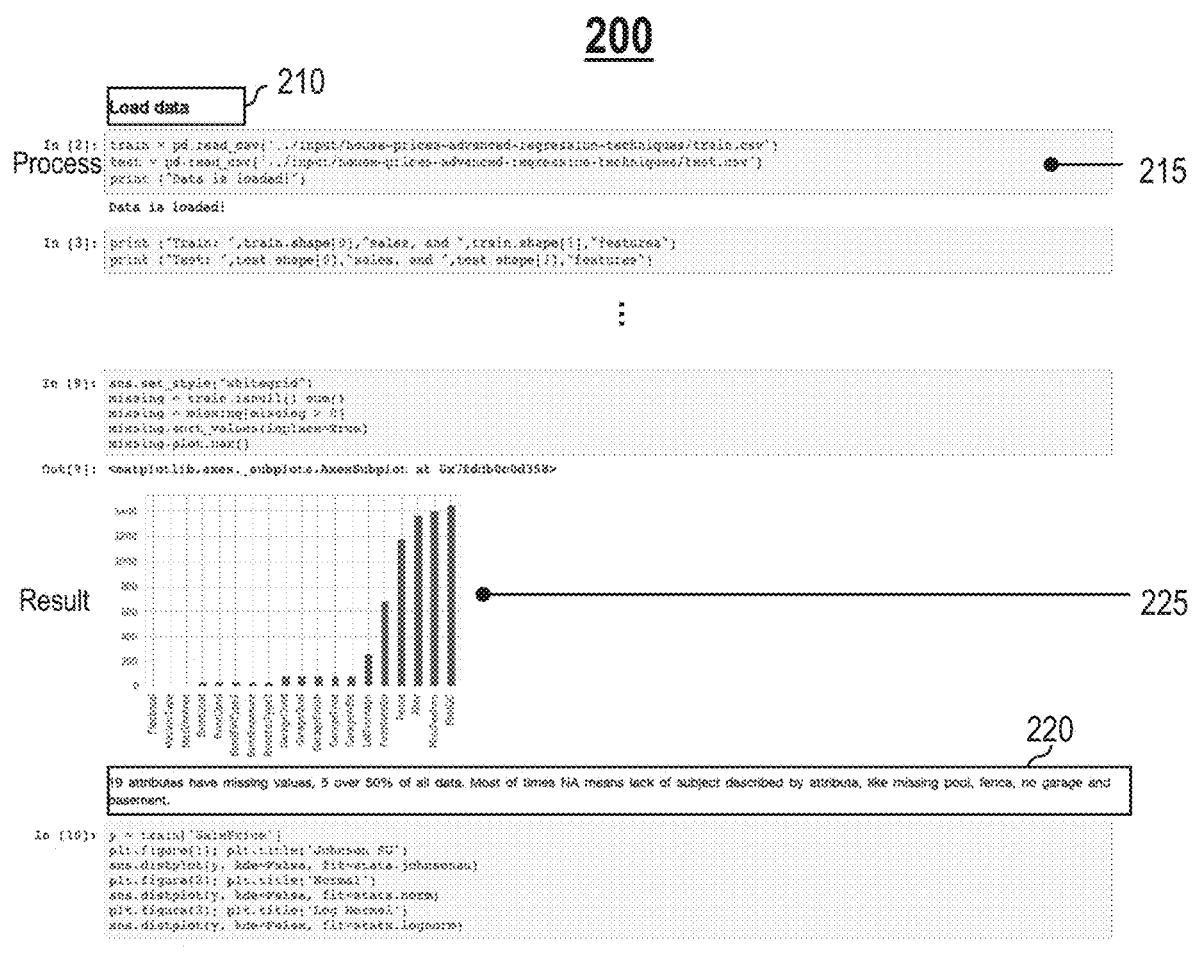

FIG. 6 illustrates examples of different categories of annotations for annotations in a computational notebook 200, in accordance with an embodiment of the invention. Assume the system 330 receives, as input, a computational notebook 200 comprising the following sections without existing annotations: (1) a section 215 of code including one or more statements loading data from a dataset, and (2) a section 225 of visualization including an inline plot of data. The system 330 classifies, via the classification system 450, the section 215 of code with a category classification label 'Process' (included in Table 2), and the section 225 of visualization with a category classification label 'Result' (included in Table 2). The system 330 predicts or generates, via the annotation generation system 460, a suggested annotation 210 for the section 215 of code, and a suggested annotation 220 for the section 225 of visualization. The annotation 220 provides insight on the results of the inline plot. The suggested annotations 210 and 220 are provided/presented as candidate annotations for user review.

Figure 7:
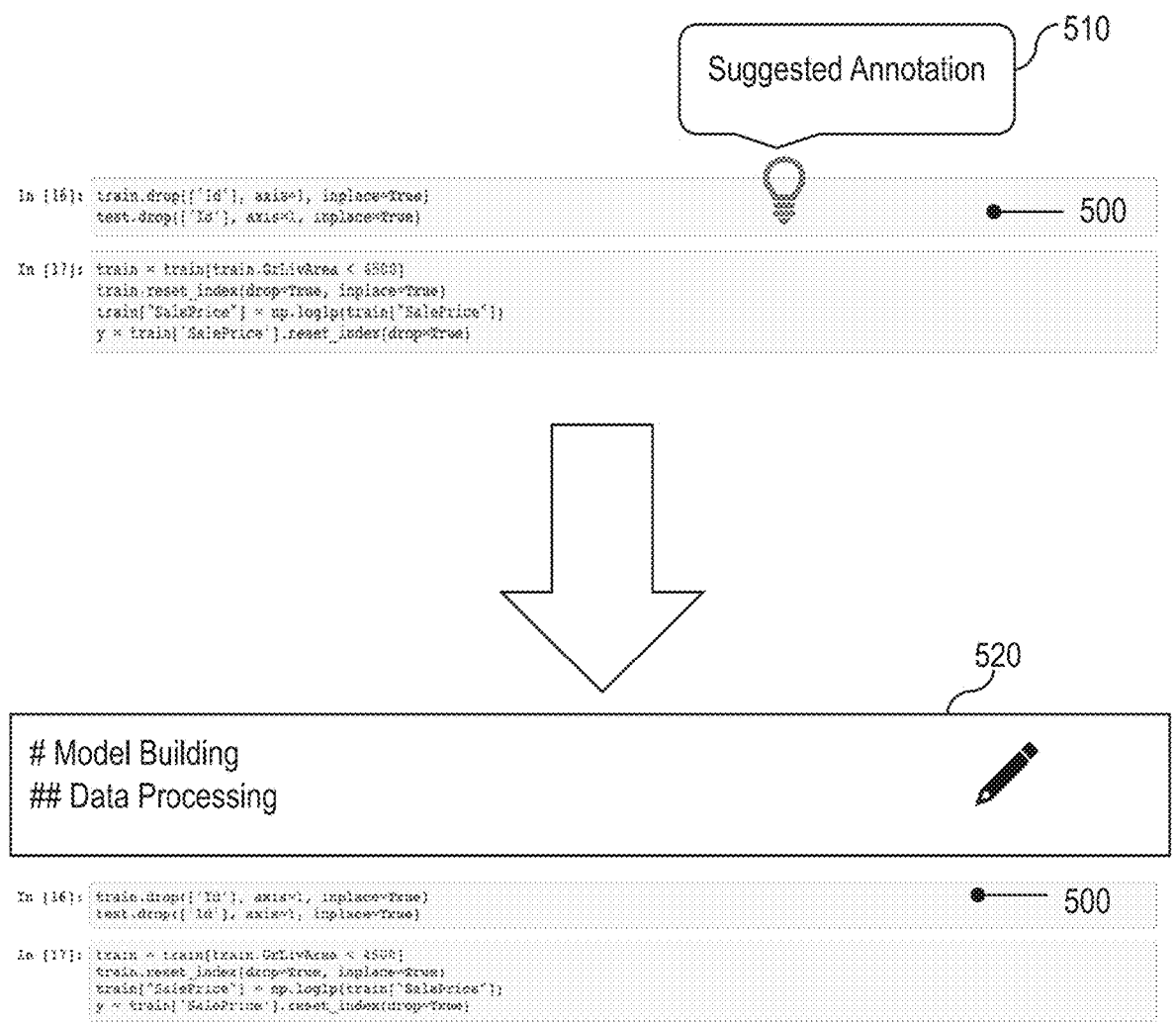
FIG. 7 illustrates an example suggested annotation presented by the system, in accordance with an embodiment of the invention.

FIG. 7 illustrates an example suggested annotation presented by the system 330, in accordance with an embodiment of the invention. In one embodiment, the system 330, via the user interaction and log system 470, is configured to generate a graphical user interface (GUI) representing a computational notebook environment. The GUI includes a section 500 of executable code/visualization without an existing annotation, and further includes an interactive GUI element 510 positioned within proximity of the section 500 of executable code/visualization (e.g., overlaid on top of the section 500 of executable code/visualization). The GUI is provided to a display of an electronic device 350 for user review.

A user can interact with the interactive GUI element 510 to view a list of candidate annotations for the section 500 of executable code/visualization. For example, in one embodiment, the interactive GUI element 510 is a tooltip, an infotip, or a hint that the user can click or touch, as shown in FIG. 7. In response to user interaction with the interactive GUI element 510, the system 330 updates, via the user interaction and log system 470, the GUI to include an editable textbox 520 displaying the list of candidate annotations for the section 500 of executable code/visualization. The user can select, edit, approve/validate, or reject any one of the candidate annotations listed. For example, in one embodiment, the user can click or touch on a pencil icon to edit the list, as shown in FIG. 7.

Figure 8:
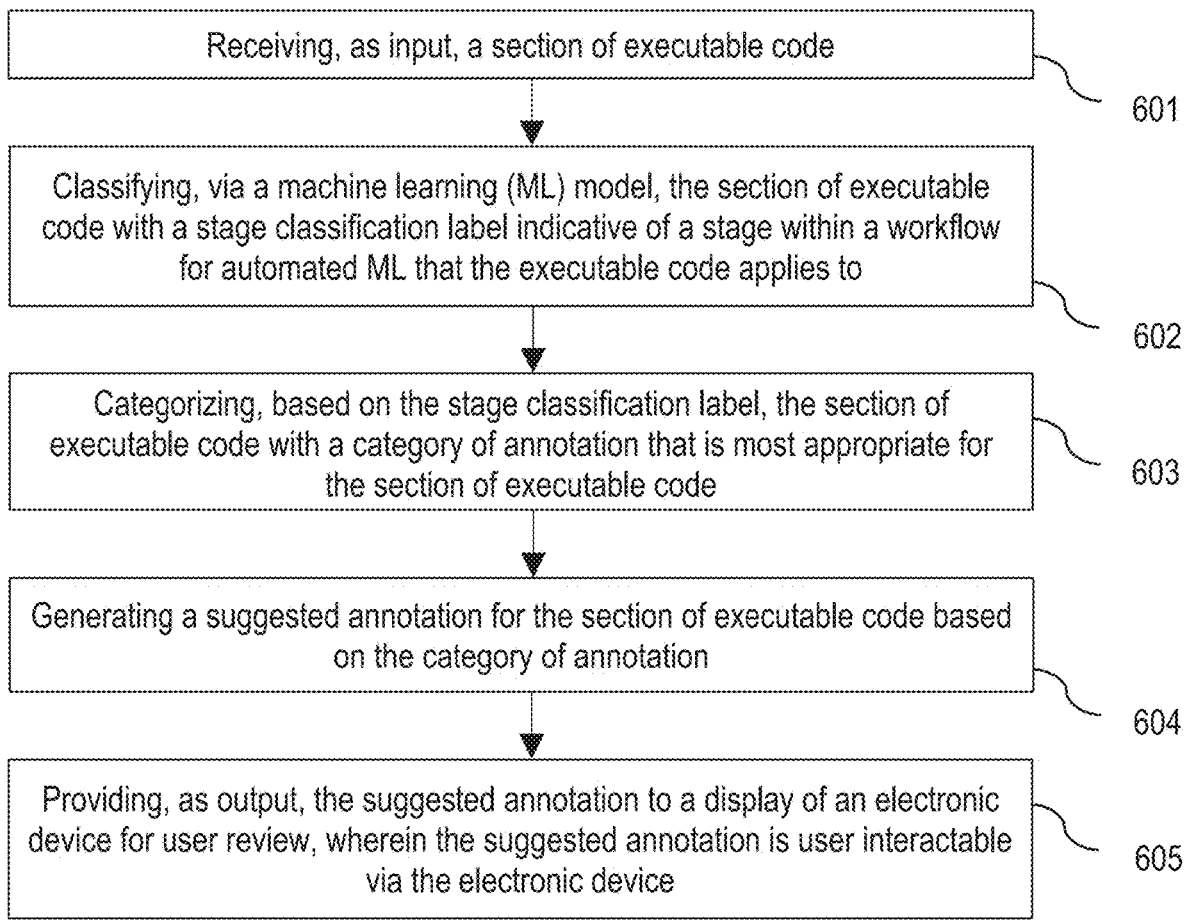
FIG. 8 is a flowchart for an example process for automated code annotation in ML and data science, in accordance with an embodiment of the invention.

FIG. 8 is a flowchart for an example process 600 for automated code annotation in ML and data science, in accordance with an embodiment of the invention. Process block 601 includes receiving, as input, a section of executable code. Process block 602 includes classifying, via a ML model, the section of executable code with a stage classification label indicative of a stage within a workflow for automated ML that the executable code applies to. Process block 603 includes categorizing, based on the stage classification label, the section of executable code with a category of annotation that is most appropriate for the section of executable code. Process block 604 includes generating a suggested annotation for the section of executable code based on the category of annotation. Process block 605 includes providing, as output, the suggested annotation to a display of an electronic device for user review, wherein the suggested annotation is user interactable via the electronic device.

In one embodiment, process blocks 601-605 are performed by one or more components of the system 330.

Figure 9:
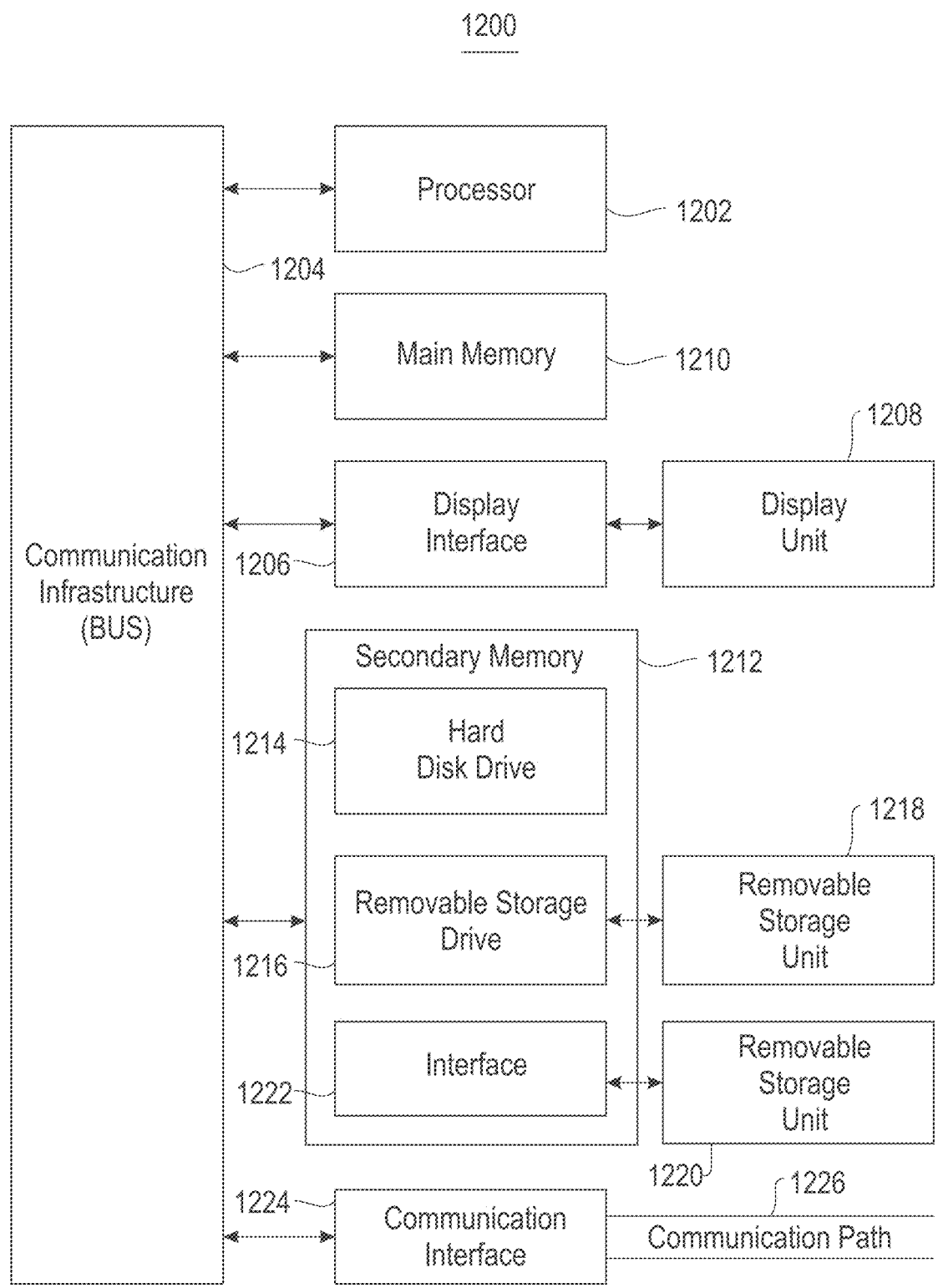
FIG. 9 is a high level block diagram showing an information processing system useful for implementing an embodiment of the invention.

FIG. 9 is a high level block diagram showing an information processing system 1200 useful for implementing one embodiment of the invention. The computer system includes one or more processors, such as processor 1202. The processor 1202 is connected to a communication infrastructure 1204 (e.g., a communications bus, cross-over bar, or network).

The computer system can include a display interface 1206 that forwards graphics, text, and other data from the voice communication infrastructure 1204 (or from a frame buffer not shown) for display on a display unit 1208. In one embodiment, the computer system also includes a main memory 1210, preferably random access memory (RAM), and also includes a secondary memory 1212. In one embodiment, the secondary memory 1212 includes, for example, a hard disk drive 1214 and/or a removable storage drive 1216, representing, for example, a floppy disk drive, a magnetic tape drive, or an optical disk drive. The removable storage drive 1216 reads from and/or writes to a removable storage unit 1218 in a manner well known to those having ordinary skill in the art. Removable storage unit 1218 represents, for example, a floppy disk, a compact disc, a magnetic tape, or an optical disk, etc. which is read by and written to by removable storage drive 1216. As will be appreciated, the removable storage unit 1218 includes a computer readable medium having stored therein computer software and/or data.

In alternative embodiments, the secondary memory 1212 includes other similar means for allowing computer programs or other instructions to be loaded into the computer system. Such means include, for example, a removable storage unit 1220 and an interface 1222. Examples of such means include a program package and package interface (such as that found in video game devices), a removable memory chip (such as an EPROM, or PROM) and associated socket, and other removable storage units 1220 and interfaces 1222, which allows software and data to be transferred from the removable storage unit 1220 to the computer system.

In one embodiment, the computer system also includes a communication interface 1224. Communication interface 1224 allows software and data to be transferred between the computer system and external devices. In one embodiment, examples of communication interface 1224 include a modem, a network interface (such as an Ethernet card), a communication port, or a PCMCIA slot and card, etc. In one embodiment, software and data transferred via communication interface 1224 are in the form of signals which are, for example, electronic, electromagnetic, optical, or other signals capable of being received by communication interface 1224. These signals are provided to communication interface 1224 via a communication path (i.e., channel) 1226. In one embodiment, this communication path 1226 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated code annotation in machine learning (ML) and data science, comprising:
    receiving, as input, a section of executable code, wherein the section of executable code is included in a notebook interface;
    classifying, via a ML model, the section of executable code with a stage classification label indicative of a stage within a workflow for automated ML that the executable code applies to;
    categorizing, based on the stage classification label, the section of executable code with a category of annotation that is most appropriate for the section of executable code;
    automatically generating a suggested annotation for the section of executable code based on the category of annotation;
    providing, as output, the suggested annotation to a display of an electronic device; and
    in response to a user selection of the suggested annotation via the electronic device, updating the notebook interface to a new version of the notebook interface, wherein the new version of the notebook interface includes the suggested annotation positioned within proximity of the section of executable code.

2. The method of claim 1, further comprising:
    tracking user interaction with the suggested annotation.

3. The method of claim 2, further comprising:
    in response to the user interaction comprising the user selection of the suggested annotation, adding the suggested annotation to the new version of the notebook interface.

4. The method of claim 3, further comprising:
    exporting the new version of the notebook interface.

5. The method of claim 2, further comprising:
    in response to the user interaction comprising a user rejection of the suggested annotation, removing the suggested annotation from the display.

6. The method of claim 2, further comprising:
    in response to the user interaction comprising a user edit of the suggested annotation, updating the suggested annotation in accordance with the user edit.

7. The method of claim 2, further comprising:
    storing the user interaction in a database; and
    updating the ML model based on one or more user interactions stored in the database.

8. The method of claim 1, further comprising:
    generating a graphical user interface (GUI) representing the notebook interface; and
    providing the GUI to the display.

9. A system for automated code annotation in machine learning (ML) and data science, comprising:
    at least one processor; and
    a non-transitory processor-readable memory device storing instructions that when executed by the at least one processor causes the at least one processor to perform operations including:
    receiving, as input, a section of executable code, wherein the section of executable code is included in a notebook interface;
    classifying, via a ML model, the section of executable code with a stage classification label indicative of a stage within a workflow for automated ML that the executable code applies to;
    categorizing, based on the stage classification label, the section of executable code with a category of annotation that is most appropriate for the section of executable code;
    automatically generating a suggested annotation for the section of executable code based on the category of annotation;
    providing, as output, the suggested annotation to a display of an electronic device; and
    in response to a user selection of the suggested annotation via the electronic device, updating the notebook interface to a new version of the notebook interface, wherein the new version of the notebook interface includes the suggested annotation positioned within proximity of the section of executable code.

10. The system of claim 9, wherein the operations further comprise:
    tracking user interaction with the suggested annotation.

11. The system of claim 10, wherein the operations further comprise:
    in response to the user interaction comprising the user selection of the suggested annotation, adding the suggested annotation to the new version of the notebook interface.

12. The system of claim 11, wherein the operations further comprise:
    exporting the new version of the notebook interface.

13. The system of claim 10, wherein the operations further comprise:
in response to the user interaction comprising a user rejection of the suggested annotation, removing the suggested annotation from the display.

14. The system of claim 10, wherein the operations further comprise:
in response to the user interaction comprising a user edit of the suggested annotation, updating the suggested annotation in accordance with the user edit.

15. The system of claim 10, wherein the operations further comprise:
storing the user interaction in a database; and
updating the ML model based on one or more user interactions stored in the database.

16. The system of claim 15, wherein the operations further comprise:
generating a graphical user interface (GUI) representing the notebook interface; and
providing the GUI to the display.

17. A computer program product for automated code annotation in machine learning (ML) and data science, the computer program product comprising a computer readable storage medium having program instructions embodied therewith, the program instructions executable by a processor to cause the processor to:
receive, as input, a section of executable code, wherein the section of executable code is included in a notebook interface;
classify, via a ML model, the section of executable code with a stage classification label indicative of a stage within a workflow for automated ML that the executable code applies to;
categorize, based on the stage classification label, the section of executable code with a category of annotation that is most appropriate for the section of executable code;
automatically generate a suggested annotation for the section of executable code based on the category of annotation;
provide, as output, the suggested annotation to a display of an electronic device; and
in response to a user selection of the suggested annotation via the electronic device, update the notebook interface to a new version of the notebook interface, wherein the new version of the notebook interface includes the suggested annotation positioned within proximity of the section of executable code.

18. The computer program product of claim 17, wherein the program instructions are further executable by the processor to cause the processor to:
track user interaction with the suggested annotation.

19. The computer program product of claim 18, wherein the program instructions are further executable by the processor to cause the processor to:
in response to the user interaction comprising the user selection of the suggested annotation, add the suggested annotation to the new version of the notebook interface.

20. The computer program product of claim 19, wherein the program instructions are further executable by the processor to cause the processor to:
export the new version of the notebook interface.

* * * * *